Figure 1:
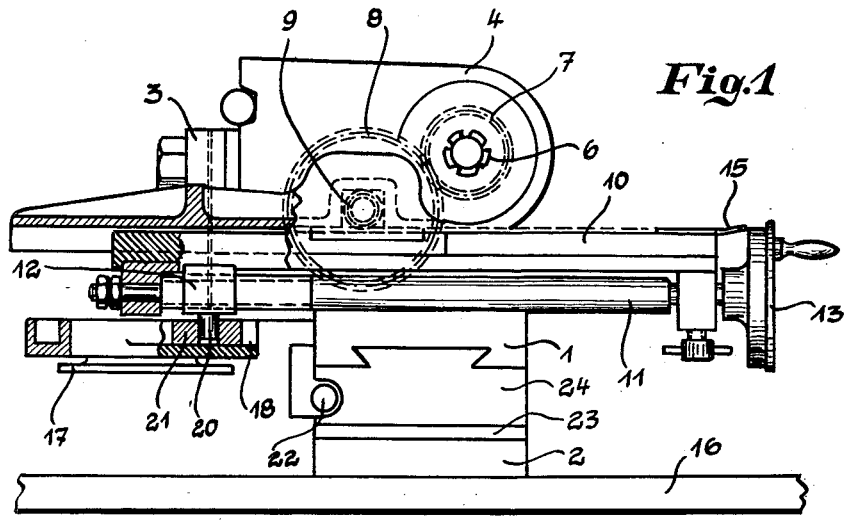

Oct. 26, 1954  H. LUCE  2,692,538
TWIST DRILL MILLING DEVICE
Filed April 6, 1949

INVENTOR.
HANS LUCE
BY

UNITED STATES PATENT OFFICE 2,692,538

TWIST DRILL MILLING DEVICE

Hans Luce, Herbornseelbach, Germany, assignor to H. Hommel G. m. b. H., Frankfurt am Main, Germany, a company of Germany Application April 6, 1949, Serial No. 85,805

Claims priority, application Germany October 1, 1948

5 Claims. (Cl. 90—11.62)

Spirally grooved workpieces, such for example, as twist drills, obliquely toothed spur wheels and the like, have hitherto been produced on machines specially designed for this particular purpose, which it is impossible for small works to acquire owing to the high cost of production, especially as such machines are not in continuous demand in such small works. The invention concerns an arrangement which can be employed on any normal machine-tool, such as a lathe, and by means of which it is possible to produce such spirally grooved workpieces satisfactorily at low cost on such normal machine-tools.

The arrangement according to the invention comprises a workpiece holder provided with a work holding spindle and adapted to be secured to the top slide of a normal compound slide rest, a rack-and-pinion drive for the work holding spindle and a guide bar fixed with respect to the working path of the top slide and adapted to be adjusted to any desired angular position with respect to the work holding spindle, a slide block for the rack being guided on the said guide bar.

The guide bar can be arranged to swivel about a pin on the machine bed supporting the compound slide rest or on the guide for the top carriage of the compound slide rest, the latter arrangement affording the advantage that the adjustment of the guide bar relatively to the work holding spindle is not varied when the work holding spindle for the workpiece is adjusted relatively to the fixed cutting tool by displacement of the bottom slide or rotation of the top slide relatively to the bottom slide.

The slide block is preferably arranged to be displaced along the rack and to be adjusted thereon by means of an adjusting spindle, so that an additional rotational movement can be imparted to the work holding spindle by actuation of the adjusting spindle, independently of the rotational movement imparted to the said work holding spindle by the displacement of the slide block along the guide bar. The angular position of the guide bar with respect to the axis of the work holding spindle determines the pitch of the spiral groove to be worked into the workpiece while in the case of multiple-thread grooves the pitch is adjusted by the adjustment of the slide block on the rack.

For working longer workpieces, there is preferably provided in association with the work holding spindle a counter-support mounted on the holder of the said spindle, for example, a normal lathe tailstock. The guide bar is mounted on a circular table arranged to swivel through 360°, so that it can be adjusted to any angular position with respect to the work holding spindle and consequently any spiral pitch can be formed and grooves having either a right-hand or a left-hand thread can be cut.

Figure 2:
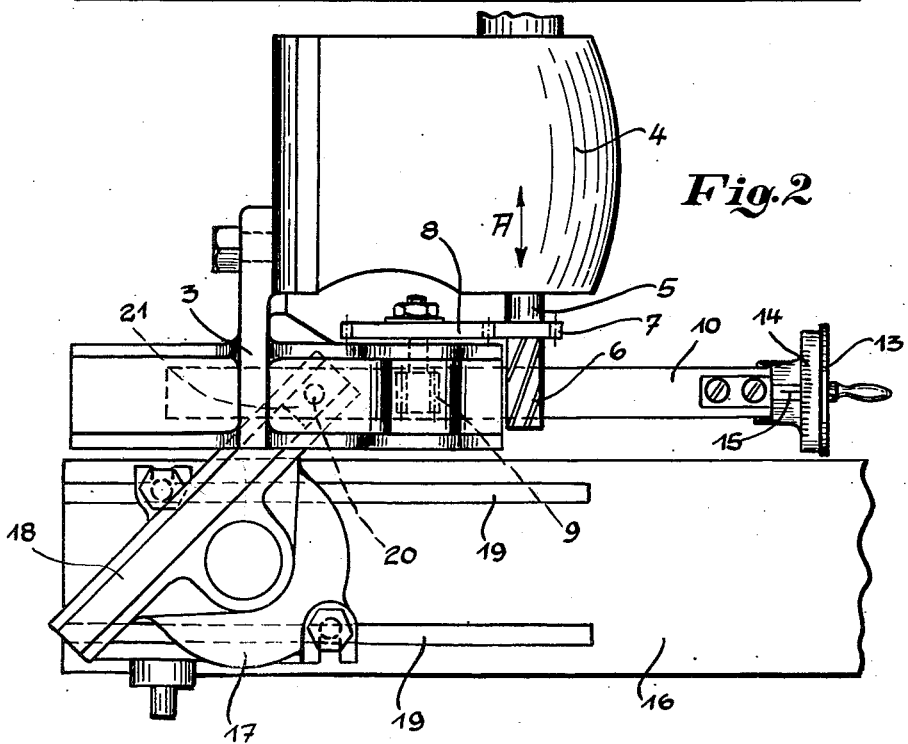

The invention will hereinafter be more fully described with reference to the embodiment illustrated by way of example in the accompanying drawings, in which:

Figure 1 is a front elevation partly in section, the unessential parts having been omitted; and Figure 2 is a plan view.

In the drawings, the invention is illustrated as applied to the mounting of the new arrangement on a lathe, with a vertically adjustable headstock the cutting tool being clamped and driven in the headstock of the said lathe. Mounted on the top carriage 1 of the normal compound slide rest 2 of the said lathe is an overhanging table 3, on which a headstock 4 is mounted. The spindle 5 of the said headstock 4 is provided with an arrangement for clamping the workpiece 6 and is coupled with a toothed pinion 9 by means of a gearing 7, 8. The pinion 9 meshes with a rack 10 displaceably mounted on the overhanging table 3 and is also supported together with the gearing by the said table 3.

The rack 10 supports on its lower side a screw spindle 11 and engaged therewith like a nut a displaceable slide block 12, the position of which in relation to the rack 10 can be adjusted by rotating the adjusting spindle 11. The adjusting head 13 of the spindle 11 is provided with a scale 14, in association with which an index 15 is provided on the rack 10.

The bed of the machine supports in front of the compound slide rest 2, a circular table 17 on which a guide bar 18 is arranged to swivel through 360°. If necessary, the intermediate plate 16 shown in the embodiment illustrated by way of example is provided. The circular table 17 is held by screw bolts guided in slots 19 in the intermediate plate 16, so that the said table can be adjusted into an optimum position with respect to those parts of the arrangement which are supported by the compound slide rest 2. The slide block 12 of the rack 10 is coupled by means of a pin 20, with a grooved block 21 mounted on the guide bar.

Thus, as soon as the fixing spindle 5 is axially displaced by displacement of the top carriage 1 of the compound slide rest in the direction of the arrow A, the grooved block 21 slides along the guide bar, which does not take part in this movement of the top carriage, and thus produces an axial displacement of the rack 10, which rotates the work holding spindle 5 through the pinion 9 and the gearing 7, 8. The degree of such rotation corresponds to the angular position of the guide bar 18 in relation to the axis of the clamping spindle 5, so that any spiral pitch can be set.

The further movement of the workpiece through the particular pitch required, for the purpose of cutting multiple grooves is effected by rotation of the adjusting spindle 11. By this adjustment, the position of the slide block 12 in relation to the rack 10 is varied, which brings about a displacement of the rack 10 and consequently an additional rotation of the work holding spindle 5, the position of the grooved block 21 in relation to the guide bar 18 remaining unchanged.

The top carriage 1 of the compound slide rest 2 is arranged to be swivelled in the normal manner with respect to the bottom slide 23, so that the work holding spindle 5 can be brought into the necessary angular position in relation to the tool.

The circular table 17, together with the guide bar 18, can also be arranged on the guide plate 24 of the top carriage 1 of the compound slide rest 2, so that when the work holding spindle 5 is adjusted relatively to the tool, the adjustment of the guide bar 18 in relation to the work holding spindle is not varied.

The new arrangement is not limited in its application to lathes, but can be employed, with the fixing and holding means hereinbefore described (compound slide rest and circular table) on any machine-tool which comprises above a supporting bed a vertically adjustable tool headstock with a drive for a cutting tool.

I claim:

1. An arrangement for the production of spirally grooved workpieces and comprising, a bed, a workholder including a work holding spindle, a compound slide rest including a top slide supporting the workholder, rack-and-pinion means driving the work holding spindle, the rack being carried by and slidable with respect to the top slide, means displaceable lengthwise of the rack, manually operable means displacing the first means, mounting means supported by the bed, a guide bar angularly adjustable on the mounting means to any fixed position with respect to the work holding spindle, and a block slidable lengthwise of the guide bar and coupled to the displaceable means.

2. The arrangement according to claim 1 and wherein the means displaceable on the rack is a slide block constituting a nut and the second means is a screw spindle journaled on the rack and threadedly engaging the nut.

3. The arrangement according to claim 1 and wherein the workpiece spindle includes a holder also comprising a counter support for the workpiece and mounted on the holder of the work holding spindle.

4. An arrangement for the production of spirally grooved workpieces comprising a compound slide rest including a top slide, a work holding spindle mounted on the top slide, rack and pinion means driving the work holding spindle, the rack being carried by and slidable with respect to the top slide, a guide bar angularly adjustable to any fixed position with respect to the work holding spindle, a slide block movable lengthwise of the rack and connected to the guide bar, a screw spindle journaled in the rack and threadedly engaging the slide block, a second slide block slidable lengthwise of the guide bar and having a groove receiving a pin secured to the first slide block.

5. An arrangement for the production of spirally grooved workpieces comprising a compound slide rest including a top slide, a work-holding spindle mounted on the top slide, rack and pinion means driving the work-holding spindle, the rack being carried by and slidable with respect to the top slide, a guide bar angularly adjustable to any fixed position with respect to work-holding spindle, a table connected to the guide bar, a plate adjustably connected to the table, a slide block movable lengthwise of the rack, a screw spindle journaled in the rack and threadedly engaging the slide block, and a second block slidable lengthwise of the guide bar and having a groove receiving a pin secured to the first slide block.

References Cited in the file of this patent

UNITED STATES PATENTS

| Number | Name | Date |
|---|---|---|
| 270,235 | Martignoni | Jan. 9, 1883 |
| 1,478,433 | Harris | Dec. 25, 1923 |
| 1,854,184 | Flanders | Apr. 19, 1932 |
| 1,976,476 | Breitenstein | Oct. 9, 1934 |
| 2,232,704 | Hughes | Feb. 25, 1941 |
| 2,330,921 | Rickenmann | Oct. 15, 1943 |
| 2,375,052 | Umbdenstock | May 1, 1945 |